Nov. 15, 1932.   W. H. JOHNSON   1,887,645
MACHINE FOR FEEDING SHEET MATERIAL
Filed Jan. 9, 1928   2 Sheets-Sheet 2
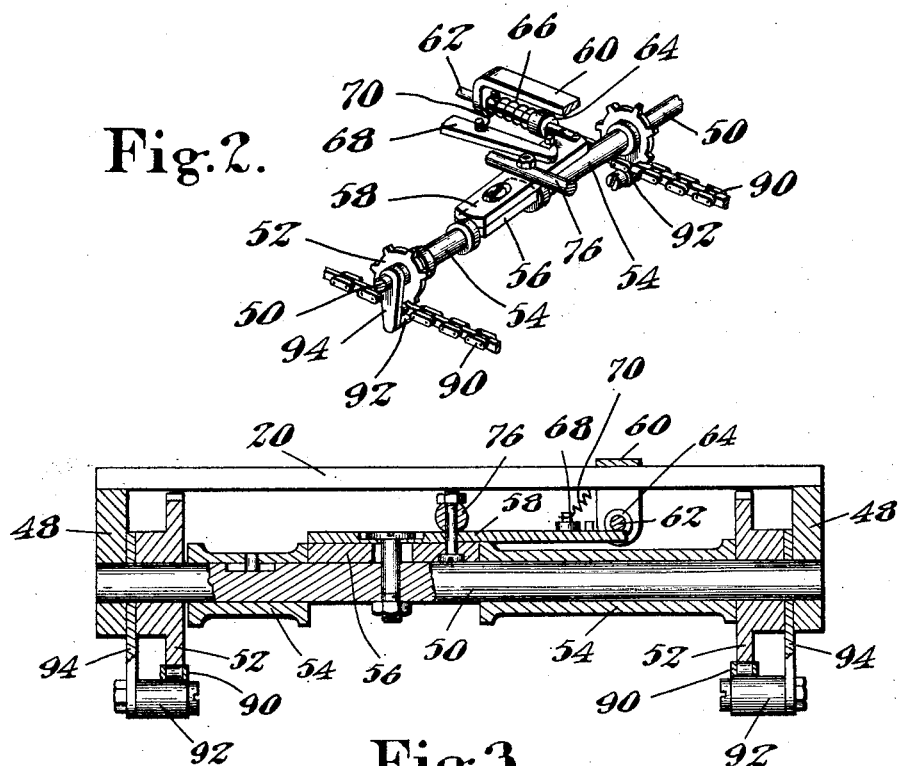
Fig. 2.
Fig. 3.
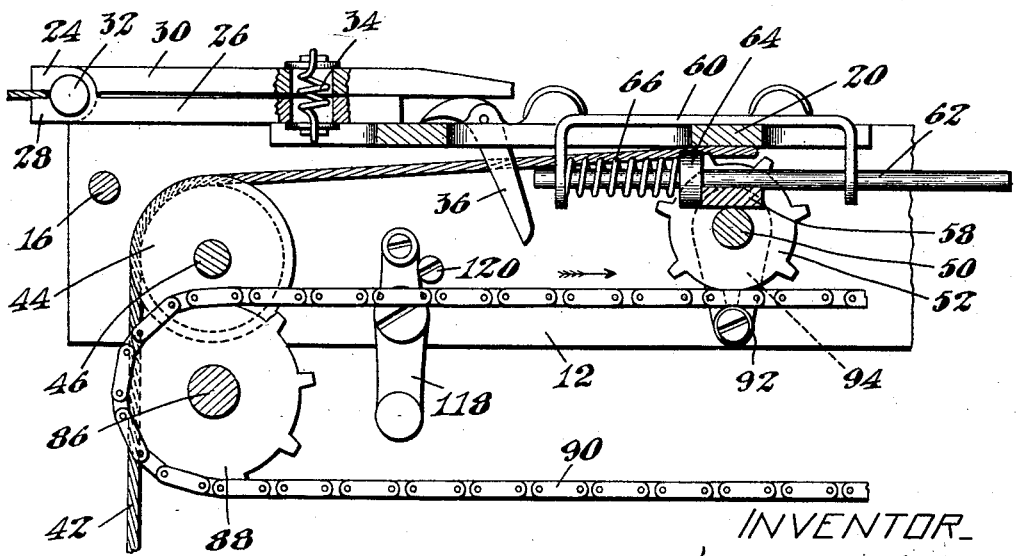
Fig. 4.
INVENTOR
William H. Johnson
By his Attorney,
Nelson P. Howard Patented Nov. 15, 1932

1,887,645

UNITED STATES PATENT OFFICE

WILLIAM H. JOHNSON, OF ARLINGTON, MASSACHUSETTS, ASSIGNOR TO UNITED SHOE MACHINERY CORPORATION, OF PATERSON, NEW JERSEY, A CORPORATION OF NEW JERSEY

MACHINE FOR FEEDING SHEET MATERIAL

Application filed January 9, 1928. Serial No. 245,439.

This invention relates to feeding mechanisms for sheet material, and is herein illustrated as embodied in a machine for chopping nail plates into strips.

In the manufacture of tacks and nails, it is the custom to chop the nail plate sheet into narrow strips or ribbons which are subsequently presented to the nail making machine. A chopping machine for this stripping work includes in its organization a reciprocatory shearing blade, at the rear of which is located a series of gauges. In accordance with the present practice, the operator grasps a plate with a pair of hand nippers and, when the blade is elevated, advances the edge of the plate beneath it and into engagement with the gauges. The shearing blade then operates to sever a strip from the edge of the plate and when the blade is again elevated, the operator must push the edge of the plate forwardly again against the gauges. Chopping machines operate continuously at high speed and it will be apparent that in order to produce strips of uniform width, the operator must advance the edge of the nail plate at each stroke of the machine so that it accurately contacts for its full width with the gauges. When it is considered the rate of operation is frequently 150 strokes per minute, the exacting requirements of the work are apparent.

An object of the present invention is to provide feeding mechanism which may be relied upon to advance a nail plate automatically and with the required degree of accuracy to the gauges of a chopping machine, in a succession of steps timed properly with respect to the stroke of the chopping knife. Besides insuring an accuracy of product never realized heretofore, such mechanism relieves the operator of the arduous labor of manipulating the nail plate by hand. It also greatly increases production in that one operator may serve two machines, placing the nail plate in the feeding device associated with one machine while the feeding device associated with a second machine is in operation.

Another advantage incident to the use of the feeding mechanism of my invention is that the operator is left free to gauge the width of the strips being produced by the chopping machine during the operation of the machine, whereas in presenting the nail plate by hand, the time consumed in gauging the strips must be taken directly from production. Frequent testing of the strips by a notched gauge is necessary in order to make sure that the setting of the gauges is accurate and undisturbed, and that the strips are being cut in the desired width and of uniform width from one end to the other.

The feeding mechanism I have devised includes means for gripping the nail plate and for maintaining a continuous uniform advancing pressure upon the same, moving it to the gauges and holding it uniformly and accurately against them and acting to advance the sheet immediately after each reciprocation of the chopping knife.

As herein shown, I provide a carriage with sheet holding nippers which are opened and closed automatically at the proper time in the cycle of the machine, together with yielding means for effecting a work feeding movement of the carriage and automatic means for returning the carriage to initial position when the nail plate in hand has been completely stripped.

The above-mentioned feeding mechanism in the illustrated machine also controls the presentation of a plate to the chopping instrumentalities in such a manner as to keep the remnant of the plate separate from the accurately gauged cut pieces. In the illustrated machine, means is accordingly provided for retracting the remnant, the retracting means being automatically operable at a predetermined point in the advance of the plate.

Many features of the invention reside in the mechanical construction and combination of parts found in the feeding mechanism of my invention. These will be best understood and appreciated from the following description of a preferred embodiment thereof, selected for purposes of illustration and shown in the accompanying drawings, in which Fig. 1 is a view in perspective of the automatic feeding mechanism and portions of a chopping machine;

Fig. 2 is a view in perspective of the mechanism for moving the carriage rearwardly;

Fig. 3 is a sectional view, on an enlarged scale, of the same mechanism; and

Fig. 4 is a view in elevation, partly in section, of the carriage and associated parts.

Figure 1:
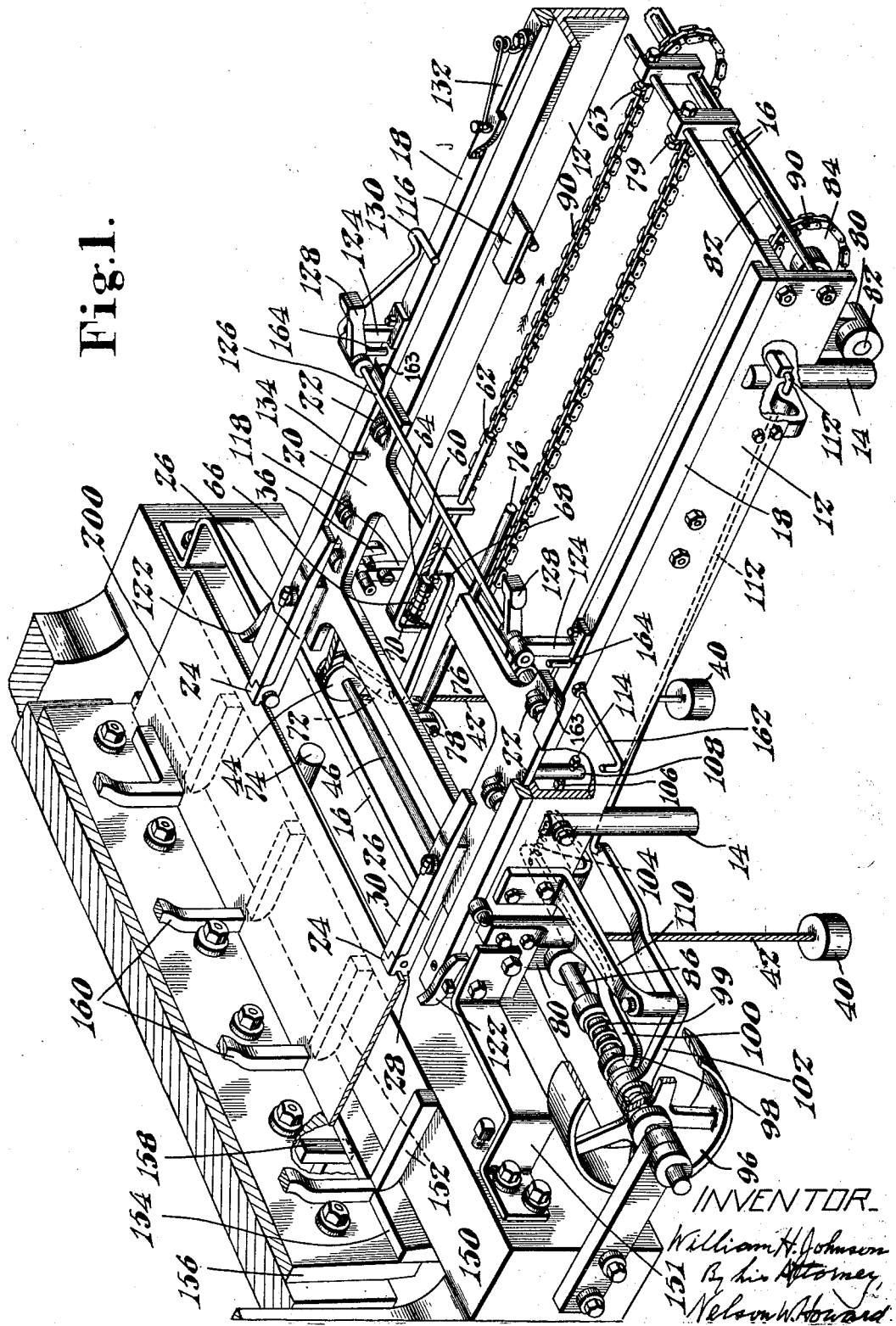

The feeding mechanism is herein shown as organized for operation in connection with a chopping machine of commercial construction and having a bed 150 to which the feeding mechanism as a unit is secured by angle irons 151.

The feeding mechanism comprises a pair of horizontally disposed flanged rails 12 supported from the floor or a platform by four legs or posts 14. The side rails 12 are secured together and maintained rigidly in parallelism by two pair of threaded rods 16, one pair located at each end of the side rails. A track is formed at the upper side of each rail, the flange of the rail forming the bottom of the track and an undercut bar 18 screwed to the edge of the rail completing the track.

A carriage 20, supported on rollers 22, is arranged to travel back and forth in the horizontal tracks. The carriage has side webs with two connecting bars and upon each side web is mounted a nipper, best shown in Fig. 4, comprising a stationary upper jaw 24 formed at the forward end of a bar 26 rigidly secured to the web, and a movable lower jaw 28 formed at the end of a bar 30 pivoted to the fixed bar 26 by a pivot pin 32. A tension spring 34, connected to the movable bar 30 and located in a socket formed in lower bar and web, serves normally to close the jaws of the nipper. The rear end of each movable bar 30 is extended beyond the end of its associated fixed bar 26 and is located in the range of movement of a dog, comprising a small bell crank lever 36 suspended between ears projecting from the web and having each a downwardly extending vertical arm. This is engaged and swung to open the nippers at the proper time in the cycle of the machine, as will presently appear.

The carriage 20 is moved forwardly to present the sheet to the chopping knife by a pair of weights 40, suspended from cords 42 connected to the rear cross bar of the carriage and running over guide pulleys 44 fast to an idle transverse shaft 46 journaled in bearings in the side rails.

The return or rearward movement of the carriage is effected by mechanism which will now be described. Projecting downwardly from the rear cross bar of the carriage 20 is a pair of lugs 48, between which is disposed a stationary transverse shaft 50 upon the outer ends of which are mounted two sprocket wheels 52. The sprocket wheels 52 are normally free to rotate but provision is made for locking them against rotation for a short interval of the machine cycle. To this end, clutch sleeves 54 are disposed on the shaft 50, one adjacent to each sprocket wheel, being free for endwise movement but having a pin and spline connection with the stationary shaft that prevents turning. Each end of both sleeves 54 is flanged and between the inner ends of the sleeves is located a cam piece 56. This is pivotally mounted upon the stationary shaft and so designed that when it occupies a position parallel to the shaft, the sleeves 54 do not engage the sprocket wheels. The ends of the cam piece 56, however, are formed in a spiral curve such that, when the cam piece is turned, the two sleeves are forced outwardly on the shaft 50 and their flanged outer ends engaged with the sprocket wheels 52, thus locking the latter rigidly to the shaft.

The cam piece 56 carries an outwardly extending arm 58 by which it is swung in opposite directions as required. To the rear cross bar of the carriage is secured a bracket 60 having its ends extended downwardly and provided with bearings for a longitudinally disposed slidable rod 62. The rod 62 has an adjustable collar 64, between which and the forward end of the bracket 60 is located a compression spring 66, normally acting to throw the rod 62 and collar 64 rearwardly. The end of the arm 58 stands in the path of the collar 64 and is carried rearwardly by the latter in its movement. A latch 68 is pivotally mounted upon the under side of the forward cross bar of the carriage and engages with its hooked end a pin projecting from the arm 58, latching in position for disengaging the sleeves and leaving the sprocket wheels free to rotate. A spring 70, extending between the latch 68 and a pin on the bracket 60, holds the latch in engaging position. The latch is provided with an angularly extending arm 72 at its forward end, which engages an adjustable stop 74 in the chopping machine frame when the carriage reaches the limit of its forward movement and trips the latch, so that the spring 66 may act to throw the cam piece and lock the sprocket wheels in stationary position. The cam piece is maintained in locking position during the reverse movement of the carriage but at the completion of its reverse movement is positively disengaged. To this end, an adjustable stop 63 is mounted on a bar carried by the rearmost pair of cross rods 16, the stop 63 being positioned to engage the rear end of the rod 62 as the carriage 20 approaches the limit of its rearward movement, thereby causing the rod 62 to compress the spring 66 and relieving the arm 58 from the pressure of the spring 66. A longitudinally extending rod 76 is pivotally mounted on the arm 58 to the right of its axis and guided for endwise movement by a pair of ears 78, downwardly extending from the lower side of the forward cross bar of the carriage. An adjustable stop 79 set in a bar carried by the rearmost pair of cross rods 16 is arranged to encounter the rear end of the rod 76 when the carriage reaches the limit of its rearward movement and to throw the rod forwardly, thus shifting the cam piece back to neutral or disengaged position, in which position it is again latched by the latch 68, the clutches 54 thus being cocked in readiness to be tripped at the conclusion of the next feeding movement.

The cam piece 56, as shown in Fig. 3, is longitudinally slotted for connection with its fulcrum pin on the shaft 50, so that in expanding the sleeves 54 it may equalize their pressure upon the two sprocket wheels 52, thus locking them both equally securely.

At each end, both side rails are provided with downwardly extending bearing brackets 80. In the rear pair of brackets is journaled an idle sprocket shaft 82, upon which are keyed two spaced sprocket wheels 84. In the forward pair of brackets 80 is journaled a driven sprocket shaft 86 upon which are keyed two spaced sprocket wheels 88. An endless sprocket chain 90 runs over each aligned pair of sprocket wheels 84—88. The upper pass of each chain is maintained in mesh with one of the sprocket wheels 52 of the carriage by a guide roll or stud 92, carried by a stationary arm 94 secured to the carriage and maintaining the stud 92 in suitable position with respect to its associated sprocket wheel 52.

The driven sprocket shaft 86 is extended outwardly from the frame of the mechanism and provided at its outer end with a driving pulley 96, which is arranged to be automatically clutched to and disengaged from the shaft 86. The pulley 96 is driven from any suitable source of power in a direction to move the upper pass of the sprocket chains 90 toward the rear or away from the chopping machine. It will be apparent that so long as the sprocket wheels 52 are free to rotate loosely upon the shaft 50, the carriage is unaffected by the movement of the sprocket chains 90 but, whenever the sprocket wheels 52 are locked by the outward movement of the sleeves 54, then the carriage 20 will be immediately carried rearwardly with the sprocket chains.

The clutch for the driving pulley 96 comprises a toothed sleeve 98, keyed to the shaft 86 and normally urged outwardly into engagement with the notched hub of the pulley 96 by a compression spring 99. The sleeve is provided with two circumferential grooves with the inner of which cooperates a latch 100 and with the outer of which cooperates a shipper 102. The latch 100 is carried by a stationary arm projecting downwardly from the adjacent side rail. It is yieldingly moved into latching position by a tension spring 104 and disengaged by an adjustable stop 106 in a post 108 projecting downwardly from the carriage 20 when the latter approaches the inner limit of its movement in that direction.

The shipper 102 is pivotally mounted in a bracket 110 secured to the side rail and is in the shape of a bell crank lever with one arm extending transversely below the rail. This arm is connected to a rod 112 extending longitudinally toward the rear of the machine and provided with an inwardly extending end standing in the path of a stop 114 on the post 108. It will be understood that when the carriage 20 reaches its extreme outward position, the rod 112 will be shifted to swing the shipper for disengaging the clutch, so that the pulley 96 will run idly and the sprocket chains 90 will be brought to rest while the work feeding movement of the carriage is taking place. When the clutch is disengaged; the latch 100 acts to latch it in disengaged condition and thus it is maintained until the conclusion of the operation, when the latch is tripped and the sprocket chains again set in motion for returning the carriage.

When the carriage is brought to the outward limit of its movement, it is desired to bring it to rest with the nippers open. To this end, a pair of projecting cam plates 116 are provided on the inner side of each rail 12 in position to engage the depending arm of the dogs 36 when the carriage arrives at the proper point and swing the dogs to open the nippers. The arm of the dog 36 rides upon the upper surface of the cam plate 116 and remains there when the carriage comes to rest, holding the nippers open.

It is also important to open the nippers at the conclusion of the inward movement of the carriage, so that the waste strip remaining in them may be thrown out at this point and not be carried back by the carriage. To this end, there is provided at the forward end of each rail a pivoted tripping piece 118 balanced to stand normally upright, free to rock forwardly at its upper end but held against rocking in the other direction by a pin 120 set in the rail. In the forward movement of the carriage the arm of the dog 36 is carried over the tripping piece 118, displacing the latter without effect. When the arm of the dog 36, however, is brought against the tripping piece 118 in the movement of the carriage toward the rear, the tripping piece being maintained against tipping, the dog is rocked upwardly to open the nippers and release the waste strip. In order to remove the waste strip positively from the jaws of the nippers, a pawl 122 is pivotally mounted at the forward end of each rail in position to swing up after the strip has been fed beyond it and engage its rear edge in its reverse movement. The tripping pieces 118 are positioned to open the jaws of each nipper simultaneously with the other.

For the purpose of accurately locating a nail plate in position to be engaged by the nippers, a pair of rear gauge pins 164 are set in the side rails at such a point as to locate the rear edge of the sheet slightly in advance of the position of the nippers when the carriage 20 occupies its extreme rearward position. An edge gauge 162 is provided adjacent to one of the rear gauges for engaging the left edge of the nail plate and locating it transversely. The bars 18 are arranged to support the rear edge of the nail plate at the proper level to be gripped by the nippers. In order, however, not to interfere with the forward travel of the carriage 20, the bars 18 are cut away so as to clear the plate when the latter is held by the nippers and fed by the carriage, the cut-away portion of each bar extending from a point 163 shortly in advance of the pin 164 to the forward end of the bar.

In order to clamp the nail plate in its gauged position, a pair of brackets 124 are secured to the side rails behind the gauge pins 164 and journaled in these brackets is a transverse shaft 126, carrying a pair of clamping members 128 and having an operating handle 130 at its right end. In Fig. 1, the clamping members 128 are shown as swung upwardly into an inoperative position. When the carriage occupies its rearmost position, however, and a nail plate has been located by the gauge pins, as already explained, the operator swings the handle 130 forwardly, clamping the nail plate against the top of the side rail in its gauged position. While so held, the operator allows the carriage to move forwardly so that the nipper jaws engage the rear end of the plate. The handle 130 is then swung rearwardly and the plate released by the clamping members 128 but maintained accurately in position upon the carriage by the nippers.

A latch 132 is provided at the rear end of the right side rail in position to engage a pin 134 on the carriage 20 and retain it in its rearmost position against the action of the weights 40. This latch is released by the operator when it is desired to begin the feeding operation.

The automatic feeding mechanism above described is herein shown as associated with a chopping machine of commercial type. As shown in Fig. 1, this includes a bed 150, having guide ribs 152 for the nail plate and a stationary shear blade 154. Cooperating with this is a reciprocatory shear blade 156 and behind the cooperating blades is located a series of gauges 158, one only of which is shown in Fig. 1. The reciprocatory blade 156 carries a series of yielding strippers 160 which prevent the nail plate from rising with the blade 156 in its upward movement. The blade 156 is reciprocated continuously in the operation of the machine at a rate of about 150 strokes per minute.

The function of the automatic feeding mechanism is to advance the edge of a nail plate 200 beneath the edge of the blade 156 each time it is elevated and into contact with the gauges 158. As shown in Fig. 1, the blade 156 has descended to sever a strip from the edge of the nail plate 200 and this strip has been carried down and delivered beneath the machine. The edge of the nail plate, therefore, engages the side surface of the blade 156 and is pressed yieldingly against it by the action of the weights 40 upon the carriage 20. When the blade 156 moves upwardly sufficiently to clear the edge of the nail plate, the latter is at once advanced beneath the edge of the blade 156 and until its forward movement is arrested by contact with the gauges 158, against which it will then be held in the same yielding manner by the action of the weights 40 through the carriage 20. The nail plate is thus accurately positioned with respect to the blade 156 through the co-operation of the above-described feeding mechanism and gauges 158.

The nail plate is advanced with the carriage in this step by step manner until it has all been cut into strips except for a narrow waste piece retained by the nippers. In the last feeding step of the carriage, the angularly projecting end 72 of the latch 68 encounters the stop 74, releasing the arm 58 and permitting the spring 66 to act in swinging the cam piece 56 and moving the sleeves 54 outwardly, thus locking the sprocket wheels 52 to the shaft 50 of the carriage. When this occurs, the carriage is immediately carried rearwardly by the sprocket chains 90. This tripping action is so sensitive and quick in action that the rearward movement of the carriage 20 begins before the knife 156 can descend and cut an imperfect strip from the waste piece of plate held by the nippers; that is to say, after the last perfect strip has been cut, the carriage must move forwardly again to some extent to trip the latch 68 and in this movement the edge of the waste strip is advanced beneath the knife. However, as already explained, the reverse movement of the carriage is initiated so promptly that the waste strip is withdrawn before the knife can descend. This is important in keeping the strips delivered by the chopping machine free of waste and emphasizes the desirability of the mechanism described as being one by which this result is secured.

In the rearward movement of the carriage 20, the nippers are opened by the action of the tripping pieces 118 and the waste piece positively removed by the action of the pawls 122 as the rear edge of the waste piece is carried against them.

When the carriage reaches the extreme limit of its rearward movement, the nippers are opened by the action of the cam pieces 116. The actuating rod 62 is advanced against the compression of the spring 66 by engaging the stop 63 and the cam piece 56 is then swung into neutral position by the engagement of the rod 76 with the stop 79 and is thereafter retained in neutral position by the latch 68. The carriage itself is retained by the latch 132, and the clutch of the driving pulley thrown out through the tripping rod 112, so that the whole mechanism is brought to rest with its elements in position to receive a new nail plate.

The automatic feeding mechanism of my invention has been described as used for feeding nail plate to a chopping machine, but it will be apparent that it might be usefully employed in feeding sheet material of any character to a chopping machine or to any other machine for performing a sequence of operations upon a sheet. The accompanying claims, therefore, should be read with the more general application of the mechanism in mind.

Having thus described my invention, what I claim as new and desire to secure by Letters Patent is:

1. A plate chopping machine having, in combination, a reciprocatory blade, work-gauging means positioned rearwardly of said blade to abut a plate to be operated upon, means for holding the plate, means for causing said plate-holding means to exert a continuous advancing pressure on the plate to cause the advancing edge of the plate to bear alternately against said blade and said work-gauging means, and means automatically operable at a predetermined point in the advance of the plate to effect retraction of the plate-holding means, thereby retracting the remnant of the plate.

2. A plate chopping machine having, in combination, a reciprocatory blade, work-gauging means located in the rear of the blade to abut a plate to be operated upon, means for holding the plate at separate points along the trailing edge of the plate, in combination with automatic feeding mechanism constructed and arranged to cause said holding means to maintain a continuous advancing pressure on the plate at said separate points along the trailing edge of the plate so that the position of the plate is alternately determined by the blade and by the work gauging means, and means automatically operable at a predetermined point in the advance of the plate to effect retraction of the holding means to retract the remnant of the plate.

3. A plate chopping machine having, in combination, a reciprocatory blade, work gauges arranged beyond the blade to abut a plate to be operated upon spaced nippers for positively engaging the plate, means for continuously urging the nippers forwardly to maintain the edge of the plate first against the gauges and then, after the reciprocatory blade has chopped off a portion of the plate, to maintain the new edge of the plate against the blade, and means automatically operable to open the nippers to release the remnant of the plate.

4. A plate chopping machine having, in combination, a reciprocatory blade, work gauges located in the rear of the blade to abut a plate to be operated upon, a pair of normally closed nippers for engaging the plate, means for advancing the nippers simultaneously with uniform pressure to advance the plate to the gauges at each stroke of the blade, means for retracting the nippers, and means automatically operable upon the retraction of the nippers to open the nippers.

5. A plate chopping machine having, in combination, a reciprocatory blade, work gauges located in the rear of the blade to abut a plate to be operated upon, nippers movable automatically between strokes of the blade in parallel paths to advance the edge of the plate accurately into contact with the gauges and hold it there with yielding pressure during the operation of the blade, means for retracting the nippers, means automatically operable at the beginning of the retraction of the nippers to release the remnant of the plate, and means automatically operable at the end of said retraction to open the nippers for the reception of a new plate.

6. A chopping machine having, in combination, a reciprocatory blade, a sheet-feeding carriage, means for moving said carriage toward said blade, means for moving said carriage from said blade, means mounted on said carriage and engageable with a sheet to advance the sheet and present the sheet to said blade, a relatively fixed stop, and means mounted on said carriage and operable by engagement with said stop as said carriage approaches said blade for rendering operative the second-mentioned carriage-moving means and thereby reversing the movement of said carriage.

7. A chopping machine having, in combination, a reciprocatory blade, a sheet-feeding carriage movable intermittently toward said blade, means on said carriage for gripping the rear edge of a sheet to advance the sheet and present the sheet to said blade, a relatively fixed stop, a member mounted on said carriage in a position to engage said stop as the carriage approaches the blade, and means actuated by said member upon engagement with said stop as the carriage approaches the blade to reverse the movement of the carriage.

8. A chopping machine having a reciprocatory blade, in combination with a sheet feeding carriage movable intermittently toward the blade and having separate sheet engaging nippers for engaging the sheet at spaced points in its trailing edge and presenting it to the blade, and means operated by the approach of the carriage to the blade for reversing the movement of the carriage.

9. A chopping machine having a blade and a series of gauges located in parallel relation thereto, other gauges for initially locating a plate with its edge parallel to but remote from the blade, a carriage having nippers arranged to engage the plate and preserve its gauged position, and means for advancing the carriage with the plate to said series of gauges.

10. Automatic sheet feeding mechanism, having in combination a carriage, separate nippers thereon, means for imparting to the carriage a work feeding movement of a yielding character, means for releasing the nippers simultaneously with respect to each other, and means for moving the carriage reversely in a positive manner.

11. Automatic sheet feeding mechanism, having in combination a carriage equipped with sheet grippers and movable in a predetermined path, yielding means for imparting a work feeding movement to the carriage, a moving member extending lengthwise of the path of movement of said carriage, and means for temporarily connecting the carriage to said moving member for movement in a direction opposite to the direction of said feeding movement.

12. Automatic sheet feeding mechanism, having in combination a carriage for sheet material, means for imparting to said carriage a feeding movement in one direction, a chain, means for driving said chain in a direction opposite to the direction of the feeding movement of said carriage, and means mounted upon the carriage for automatically connecting the carriage to said chain when the carriage reaches a predetermined point in its feeding movement.

13. Automatic sheet feeding mechanism, having in combination a chain driven in one direction, a reciprocable carriage for sheet material movable independently of the chain in the opposite direction for feeding the work, means for moving the carriage in said opposite direction, and means operable automatically at the completion of the movement of the carriage in said opposite direction to connect the carriage to the chain for movement in the first-mentioned direction simultaneously with the chain.

14. Automatic sheet feeding mechanism, having in combination a driven chain, a sheet feeding carriage, connecting means between said carriage and said chain, means for automatically controlling said connecting means, and actuating means for said controlling means, said actuating means being operable by movement of the carriage in a direction opposite to the direction of movement of the chain, to cause said controlling means to render said connecting means effective to move the carriage with the chain.

15. Automatic sheet feeding mechanism, having in combination a carriage movable in one direction to feed the work, an actuating member driven in the other direction, a clutch in the carriage constructed and arranged to be tripped for connecting the carriage to said actuating member, and means operable at the conclusion of the feeding movement of said carriage to trip said clutch.

16. Automatic sheet feeding mechanism, having in combination a carriage movable in one direction to feed the work, a chain driven in the opposite direction, a sprocket wheel mounted in the carriage, meshing with the chain and running idly during the feeding movement of the carriage, and a clutch for locking the sprocket wheel upon the carriage.

17. Automatic sheet feeding mechanism, having in combination a carriage movable to feed the work and having a pair of spaced sprocket wheels, a pair of meshing chains driven in the direction opposite to the direction of the work feeding movement of said carriage, and a clutch located between said sprocket wheels and operating to lock them both upon the carriage.

18. Automatic sheet feeding mechanism, having in combination a carriage movable in one direction to feed the work and having a sprocket wheel, a chain driven in the opposite direction and meshing with said sprocket wheel, a spring actuated clutch for said sprocket wheel constructed and arranged to be cocked prior to the feeding movement of the carriage and tripped at the conclusion of its feeding movement.

19. Automatic sheet feeding mechanism, having in combination a carriage movable in one direction to feed the work and having spaced sprocket wheels mounted therein, chains driven in the opposite direction and meshing with said sprockets, spaced clutch sleeves located between the sprockets, a rocking piece for expanding the sleeves into clutching engagement with the sprockets, a spring actuator therefor, and a tripping device for timing the operation thereof.

20. Automatic sheet feeding mechanism, having in combination side rails, a sheet feeding carriage traveling thereon and having sheet nippers, said rails serving to support a sheet preliminarily but being cut away so as to clear the sheet when the latter is held by said nippers and fed by said carriage.

21. Automatic sheet feeding mechanism, having in combination a carriage for sheet material movable progressively and intermittently in the feeding operation, driving mechanism including a clutch for moving the carriage reversely, and means for tripping the clutch to bring said driving mechanism to rest when the carriage reaches the outward limit of its reverse movement.

22. Automatic sheet feeding mechanism, having in combination a carriage for sheet material, driving mechanism arranged to be connected periodically to the carriage, a clutch for controlling the operation of the driving mechanism, and means for automatically disconnecting the carriage from said driving mechanism and also for bringing said mechanism to rest when the carriage reaches a predetermined point in its travel.

23. Automatic sheet feeding mechanism, having in combination a support, a carriage having nippers movable on the support, gauges for locating a sheet, and hand operated clamping means for holding the nail sheet as located by the gauges preliminarily to its engagement by the nippers of said carriage.

In testimony whereof I have signed my name to this specification.

WILLIAM H. JOHNSON.